B. TEMPLE.
COMBINED KETTLE AND COOKING APPARATUS.
No. 177,083.                                    Patented May 9. 1876
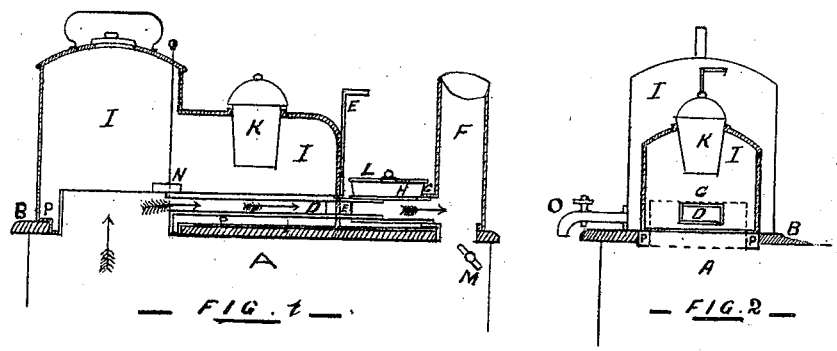
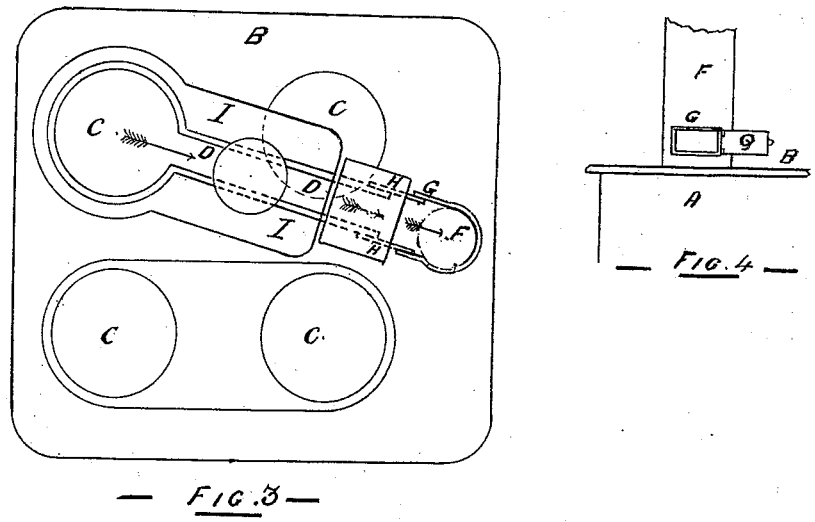
WITNESSES
INVENTOR
Benjamin Temple

UNITED STATES PATENT OFFICE.

BENJAMIN TEMPLE, OF HAMILTON, CANADA.

IMPROVEMENT IN COMBINED KETTLES AND COOKING APPARATUS.

Specification forming part of Letters Patent No. 177,083, dated May 9, 1876; application filed November 27, 1875.

*To all whom it may concern:*

Be it known that I, BENJAMIN TEMPLE, of the city of Hamilton, in the county of Wentworth, in the Province of Ontario, in the Dominion of Canada, machinist, have invented a new and useful Combined Tube-Kettle and Cooking Apparatus, to be used on the ordinary cooking-stoves now in use, and which invention is fully set forth in the following specification, reference being had to the accompanying drawings.

The object of my invention is to boil the kettle full of water in a much shorter time and with far less fuel than can be done with kettles now in use, and also at the same time to cook eggs or meat with the egg-boiler and pan forming part of the apparatus.

The invention is illustrated more in detail in the sections, Figures 1 and 2, and the plane view, Fig. 3. It consists of a kettle formed as shown, the front part having a projecting bottom to fit down in the hole C in the top plate B of the stove A, the back part of the kettle extending backward on the stove. Through the center of the kettle I there is fitted a fire tube or chamber, D, one end opening at the fire-hole of the stove, the other end connected with the stove-pipe F by means of the connecting-slide (or link-piece) H, so that the fire or flame passes up from the fire-box and through the fire-tube D, as shown by the arrows on drawing, and passes up into the stove-pipe F, the heat in the tube being regulated by the damper E, fitted in it. On the back part of the kettle the egg-boiler K is fitted, and on the space between the kettle and the stove-pipe on top of the fire-tube the meat-pan L is placed for cooking meat. In the kettle I there is a float, N, fitted, which indicates when the water is low by means of a rod outside on top of kettle, which rises or falls with the water.

The kettle I has a clear water-space, P, all around the fire-chamber D, so that a large heating-surface is presented to the water in addition to the heating-surface given by the bottom of the front part of the kettle being in direct contact with the fire, and the bottom of the back part of the kettle resting on the top plate of the stove B.

When the kettle is not in use the door Q on the neck G of the stove-pipe F is closed, the kettle taken off, and the lid C put on.

When it is required to use the apparatus the front lid is lifted off the stove, the kettle is set on, and the fire-tube D is connected with the neck G by moving the connecting-slide H into it and over the end of the fire-tube D; the flame then rushes through the fire-chamber, the water in the kettle is quickly boiled, and the eggs and meat cooked.

By actual test this kettle (containing, say, ten quarts of water) will boil in fifteen minutes with one-half the fuel used with the ordinary kettle, which requires, with a good fire, double the time to boil the same quantity of water.

This tube-kettle is particularly adapted for use in warm weather, as a small quantity of pine or other light wood will give a blazing fire, which, passing through the fire-tube D, will boil the water before the stove gets so heated as to become disagreeable.

When the damper E in the fire-tube is closed the damper M in the back of the stove must be opened to allow the heat and flame to pass off, in the usual way, into the stove-pipe F, instead of passing up through the fire-tube D.

As shown by the plane view, Fig. 3, the wash-boiler can be placed on the stove at the same time with this kettle and apparatus.

I claim as my invention—

1. The kettle I, with the fire tube or chamber D fitted through the center of it, all surrounded by the water-spaces P, in connection with the damper E and the float N, for the purposes shown.

2. The connecting-slide H, in connection with the neck G and the stove-pipe F, for the purposes shown.

BENJAMIN TEMPLE.

Witnesses:
JOHN H. YOUNG,
JAMES STURDY.